Patented Oct. 14, 1947

2,428,844

UNITED STATES PATENT OFFICE 2,428,844

FLY SPRAYS

Samuel I. Gertler and Herbert L. J. Haller, Washington, D. C., assignors to United States of America, as represented by the Secretary of Agriculture No Drawing. Application October 9, 1944, Serial No. 557,920

3 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insecticidal spray compositions for combating flies, gnats, mosquitoes, and similar insects.

Extracts of insecticidal plant products, such as pyrethrum flowers, derris, cube, barbasco, timbo, and the like, are widely used for the control of insect pests of the type mentioned above. Toxic agents of these types are generally employed in a solvent, such as a mineral oil fraction like refined kerosene, naphtha, and so forth. Sprays containing pyrethrins have been found very useful due to their quick paralyzing or knockdown action on flies and the like. However, low concentrations are generally used because of the high cost, and in such concentrations the percentage kill is relatively low compared to the percentage knockdown. Extracts of rotenone-containing plants, such as derris, cube, and the like, give a higher kill over a much longer period of time, but lack a knockdown action. A spray composition, therefore, which combines the properties of high knockdown and high kill is most desirable.

The object of this invention is the provision of economical insecticidal spray compositions having high percentage of both knockdown and kill.

The above object is accomplished by preparing a composition composed of a stable, substantially odorless and colorless knockdown agent which, in itself, has little or no insecticidal value against the insects to be combated, but which has a high knockdown value, and an insecticidal toxic agent which show high kill over an extended period of time, but give no appreciable knockdown. Such compositions, containing as essential active ingredients a knockdown agent and an insecticidal toxic agent, have been found to be highly effective insecticidal compositions against flying insects.

We have discovered that N,N-diisopropylacetamide, N,N-diisobutylacetamide, and N-heptylacetamide have an unusually high knockdown effect, but little or no toxicity to houseflies. They have been found to be compatible with known insecticides, and when combined therewith, produce superior insecticidal compositions of high knockdown and kill.

The following Examples IV and V illustrate this invention, while Examples I, II, and III show the value of N,N-diisopropylacetamide, N,N-diisobutylacetamide, and N-heptylacetamide as knockdown agents.

Example I

A 5% solution of N,N-diisopropylacetamide in refined kerosene gave a 99% knockdown of houseflies in 10 minutes with a resultant negligible kill of 2% in 24 hours.

Example II

A 5% solution of N,N-diisobutylacetamide in refined kerosene gave a 88% knockdown of houseflies in 10 minutes and no kill in 24 hours.

Example III

A 5% solution of N-heptylacetamide in refined kerosene gave a 93% knockdown of houseflies in 10 minutes and no kill in 24 hours.

Example IV

A refined kerosene solution containing 5% of N,N-diisopropylacetamide as a knockdown agent, and 1 milligram per milliliter of 2,2-bis(p-chlorophenyl)-1,1,1-trichloroethane as a toxic agent, produced a fly spray which gave a knockdown substantially equivalent to high grade commercial pyrethrum sprays, and, in addition, a far higher kill.

The substitution of equal amounts of N,N-diisobutylacetamide and N-heptylacetamide under the same conditions as the above example, gave similar results.

Example V

A refined kerosene extract of derris or cube root comprising 5% of N,N-diisopropylacetamide as a knockdown agent produced a fly spray which gave a knockdown substantially equivalent to high grade commercial pyrethrum sprays, and, in addition, a far higher kill.

The substitution of equal amounts of N,N-diisobutylacetamide and N-heptylacetamide under the same conditions as the above example, gave similar results.

Roots practically free of rotenone, but which contain rotenoids, can also be used. By "rotenoids" are meant substances other than rotenone but structurally related to it, naturally occurring in leguminous fish-poison plants, e. g., Derris, Lonchocarpus, Mundulea, and Tephrosia (R. C. Roark, Journal of Economic Entomology, volume 33, page 416 (1940)). This gives a more economical product since either low grade roots, or roots from which most of the rotenone has been removed, can be employed.

It is to be understood that other toxic agents may be used which give a high kill, but possess little or no knockdown value. Also, the proportions of the ingredients may be varied so as to produce a well balanced fly spray.

The advantage of compositions of this invention is that the paralyzing action of the knockdown agent probably weakens the insects and thereby renders them easier to kill. Accordingly, weaker toxic agents, or smaller percentages of stronger toxic agents, may be employed than could be employed without the knockdown agent.

Having thus described our invention, we claim:

1. A fly spray comprising a member selected from the group consisting of N,N-diisopropylacetamide, N,N-diisobutylacetamide, and N-heptylacetamide as its essential knockdown agent and 2,2-bis(p-chlorophenyl)-1,1,1-trichloroethane as its essential active insecticidal ingredient, incorporated in a mineral oil carrier.

2. A fly spray comprising N,N-diisopropylacetamide as its essential knockdown agent and 2,2-bis(p-chlorophenyl)-1,1,1-trichloroethane as its essential active insecticidal ingredient, incorporated in a mineral oil carrier.

3. A method of destroying flying insects comprising contacting said insects with a composition containing a member selected from the group consisting of N,N-diisopropylacetamide, N,N-diisobutylacetamide, and N-heptylacetamide as its essential knockdown agent and 2,2-bis(p-chlorophenyl)-1,1,1-trichloroethane as its essential active insecticidal ingredient.

SAMUEL I. GERTLER.
HERBERT L. J. HALLER.

REFERENCES CITED

The following references are of record in the file of this patent:

UNITED STATES PATENTS

| Number | Name | Date |
| --- | --- | --- |
| 2,166,119 | Bousquet | July 18, 1939 |
| 2,166,120 | Bousquet | July 18, 1939 |
| 2,329,074 | Mueller | Sept. 7, 1943 |
| 2,386,779 | Coleman et al. | Oct. 16, 1945 |